United States Patent Office 3,514,994
Patented June 2, 1970

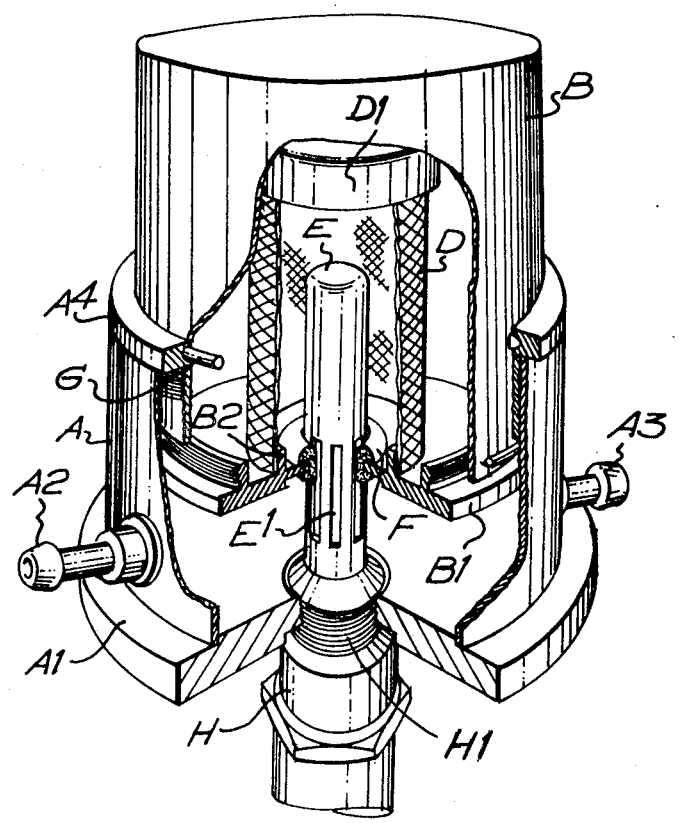

3,514,994
PROBE AND TEST CHAMBER FOR MOISTURE SENSING DEVICE
John Leonard Shaw, 22 Rawson Road, Westgate, Bradford, Yorkshire, England
Filed May 12, 1969, Ser. No. 823,548
Int. Cl. B01d 53/18
U.S. Cl. 73—76    3 Claims

ABSTRACT OF THE DISCLOSURE

In an apparatus for determining the moisture content of samples of air, liquids or gases using a moisture probe, the improvement comprising the combination of a probe and a first container defining a testing chamber into which a sample can be introduced, a second container defining a drying chamber to contain a dessicant, and means for sealing these chambers from each other and from the surrounding atmosphere, the containers being interconnected and the probe being supported so that relative movement between the probe and the second container acts alternatively to isolate said probe element in the drying chamber when a test is not being made and to expose said probe element to a sample in said testing chamber when a test is to be made, the arrangement being such that this transition can be effected without exposing the probe element to any other surround influences. Preferably the second container telescopes within the first container and the probe is mounted on the latter to project into the former.

---

This invention relates to the determination or estimation of moisture content of air, liquids or gases, and particularly of what are called "dry" samples.

When it is desired to make a quick check of the moisture content of air or a gas of low moisture content, the main difficulty is the time taken to purge the moisture probe (in whatever form it may be) and to remove the excess water from it and from its container. The time required for this purge may range from minutes to days.

If, as is frequently done, the probe is stored in a sealed jar or other vessel containing a desiccant so that it is ready for instant use, the probe becomes contaminated with moisture whilst being transferred to the testing apparatus so that an accurate test of the sample is difficult.

In order to overcome this difficulty and to enable accurate checks of samples to be made quickly and at short notice, there is provided according to this invention a combination apparatus in which a testing chamber is associated with a probe-drying chamber and means are provided for isolating the probe in the drying chamber when a test is not being made and for exposing the probe to the contents of the testing chamber when a test is to be made, the transition being effected without exposing the probe to any other surrounding influence.

The two chambers may be associated by interconnecting them telescopically or otherwise, the probe being secured to the testing chamber portion, or the probe itself may be movable between a testing position and a drying position.

One construction of apparatus according to the invention is illustrated merely by way of example in the accompanying drawing which is a partly cut-away perspective view.

In this drawing is shown an outer cylindrical container A secured to a base A1, sample inlet and outlet connectors A2, A3 respectively and an upper sleeve portion or flange A4, this container forming the testing chamber. Within the sleeve portion A4, there slides telescopically an inner closed-top cylindrical container B secured to a base B1 having an annular rib B2 locating a cylindrical filter D with cap D1, this container B forming a probe-drying chamber and holding a desiccant (not shown). The body H of the probe is secured centrally in the base A1 by a connector H1 and its shield E projects through a central aperture in the base B1 into the drying chamber and has, in its lower part, apertures E1 through which the sensing element itself is exposed to moisture from the sample. A rubber or like grommet F, lining said central aperture in the base B1, seals the drying chamber from the testing chamber and an O-ring or other seal G seals the testing chamber from the surrounding atmosphere.

As shown in the illustration, container B has been pulled upwards relatively to the container A to expose the probe element through apertures E1 for testing a sample introduced into container A through inlet A2. If desired, the volume of the sample may be indicated by the degree of extension of container B as shown by a scale on the latter. When container B is pushed fully into container A until base B1 contacts base A1, the apertures E1 are wholly within the drying chamber but guarded by filter D and the probe will thus be purged and held in a dry condition ready for use again at a moment's notice, so that a reading can be taken in a matter of seconds only.

The apparatus may be made from metal or any other suitable material and may be of a shape other than the generally cylindrical one illustrated. It can be of simple construction and is readily portable.

The probe can be held in a dry condition which may be less than one part in a million parts of water vapour in the air surrounding the probe in the drying chamber.

Instead of the two chambers being interconnected telescopically as illustrated, they might be spaced apart along a common central axis and interconnected by a short length of telescopic hose to form a bellows connection.

What is claimed is:

1. In an apparatus for determining the moisture content of samples of air, liquids or gases in which there is placed a moisture probe, the improvement comprising the probe in combination with a first container defining a testing chamber, means for supporting said first container, inlet and outlet means for introducing a sample to said testing chamber and removing it therefrom, a second container defining a drying chamber for holding a desiccant and connected to said first container by means which seals said drying chamber from said testing chamber and from the surrounding atmosphere, means for supporting said probe so that the probe and said second container can be moved relative to one another alternatively to isolate said probe in said drying chamber when a test is not being made and to expose said probe to a sample in said testing chamber when a test is to be made, the arrangement being such that this transition can be effected without exposing the probe to any other surrounding influence.

2. Apparatus according to claim 1, wherein said two containers are interconnected for movement relative to one another and said probe is secured to said first container defining the testing chamber.

3. In an apparatus for determining the moisture content of samples of air, liquids or gases using a moisture probe, the improvement comprising the probe in combination with a first container defining between its side walls and one end wall a testing chamber, means for supporting said first container, inlet and outlet means for introducing a sample to said testing chamber and removing it therefrom, a second container which defines a drying chamber for holding a desiccant and which is mounted on said first container for telescopic movement partly within said first container to form the other end wall of said testing chamber, means for sealing said testing chamber from said drying chamber and from the surrounding atmosphere, means for mounting said probe on said first container with the probe extending in the direction of said telescopic movement and into said drying chamber, said probe having a casing with apertures therein through which the sample gains access to the probe, said telescopic movement being sufficient alternatively to isolate said probe in said drying chamber when a test is not being made and to expose said probe to a sample in said testing chamber when a test is to be made, the arrangement being such that this transition can be effected without exposing the probe to any other surrounding influence.

References Cited

UNITED STATES PATENTS 3,329,004    7/1967    King _____ 73—23

RICHARD C. QUEISSER, Primary Examiner

M. SMOLLAR, Assistant Examiner

U.S. Cl. X.R.

73—29